US010367581B2

United States Patent
Iizuka et al.

(10) Patent No.: US 10,367,581 B2
(45) Date of Patent: Jul. 30, 2019

(54) NOTIFICATION DEVICE, NOTIFICATION METHOD, AND NON-TRANSITORY RECORDING MEDIUM

(71) Applicant: CASIO COMPUTER CO., LTD., Tokyo (JP)

(72) Inventors: Nobuo Iizuka, Tokyo (JP); Masaaki Kikuchi, Tokyo (JP); Keiichi Kaneko, Kanagawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/693,969

(22) Filed: Sep. 1, 2017

(65) Prior Publication Data
US 2018/0083703 A1 Mar. 22, 2018

(30) Foreign Application Priority Data
Sep. 20, 2016 (JP) .................................. 2016-182570

(51) Int. Cl.
*G06T 7/73* (2017.01)
*H04B 10/116* (2013.01)

(52) U.S. Cl.
CPC ............. *H04B 10/116* (2013.01); *G06T 7/73* (2017.01); *G06T 2207/10024* (2013.01); *G06T 2207/10152* (2013.01); *G06T 2207/30204* (2013.01)

(58) Field of Classification Search
CPC ....................................... H04B 10/11–10/118
See application file for complete search history.

(56) References Cited

U.S. PATENT DOCUMENTS

| | | | |
|---|---|---|---|
| 2013/0251374 A1* | 9/2013 | Chen .................. | H04B 10/1141 398/118 |
| 2015/0139660 A1* | 5/2015 | Son ...................... | H04B 10/116 398/118 |

FOREIGN PATENT DOCUMENTS

JP  2004-180187 A  6/2004

* cited by examiner

*Primary Examiner* — Casey L Kretzer
(74) *Attorney, Agent, or Firm* — Fitch, Even, Tabin & Flannery LLP (57) ABSTRACT

A portable terminal detects a color change region corresponding to a marker in frames, and determines whether the brightness and/or hue change with time in the color change region matches a search rule. Subsequently, when the brightness and/or hue change with time in the color change region matches a search rule, the portable terminal restores information by decoding and determines whether the information is the content of predetermined information corresponding to the search rule determined to match. Furthermore, when the restored information is the content of predetermined information corresponding to the search rule determined to match, the portable terminal displays the information in association with the color change region to provide notice that the corresponding flying object is an appropriate flying object performing optical communication.

15 Claims, 6 Drawing Sheets

NOTIFICATION DEVICE, NOTIFICATION METHOD, AND NON-TRANSITORY RECORDING MEDIUM

CROSS-REFERENCE TO RELATED APPLICATION

This application claims the benefit of Japanese Patent Application No. 2016-182570, filed on Sep. 20, 2016, the entire disclosure of which is incorporated by reference herein.

FIELD

This application relates generally to a notification device, a notification method, and a non-transitory recording medium.

BACKGROUND

Conventionally, as disclosed in Unexamined Japanese Patent Application Kokai Publication No. 2004-180187, there are techniques for a reception end including an image sensor to receive optical signals transmitted by multiple transmission ends in communication systems using optical communication.

SUMMARY

A notification device according to the present disclosure includes:
an acquirer that successively acquires images;
a searcher that acquires a predetermined image region corresponding to a detection target from the images successively acquired by the acquirer; and
a notifier that provides a notice, when the predetermined image region is acquired by the searcher, as to whether the predetermined image region is a region of information transmitted by a transmission device of a visible light communication system by means of light emission based on optical change in the predetermined image region and search rules for each of multiple kinds of signal formats.

Moreover, a notification method according to the present disclosure includes:
an acquisition step of successively acquiring images;
a search step of acquiring a predetermined image region corresponding to a detection target from the successively acquired images; and
a notification step of providing a notice, when the predetermined image region is acquired in the search step, as to whether the predetermined image region is a region of information transmitted by a transmission device of a visible light communication system by means of light emission based on optical change in the predetermined image region and search rules for each of multiple kinds of signal formats.

Moreover, a non-transitory recording medium according to the present disclosure is a non-transitory computer-readable recording medium storing a program for causing a computer to function as:
an acquirer that successively acquires images;
a searcher that acquires a predetermined image region corresponding to a detection target from the images successively acquired by the acquirer; and
a notifier that provides a notice, when the predetermined image region is acquired by the searcher, as to whether the predetermined image region is a region of information transmitted by a transmission device of a visible light communication system by means of light emission based on optical change in the predetermined image region and search rules for each of multiple kinds of signal formats.

BRIEF DESCRIPTION OF THE DRAWINGS

A more complete understanding of this application can be obtained when the following detailed description is considered in conjunction with the following drawings, in which.

DETAILED DESCRIPTION

An optical communication system according to an embodiment of the present disclosure will be described below with reference to the drawings.

Figure 1:
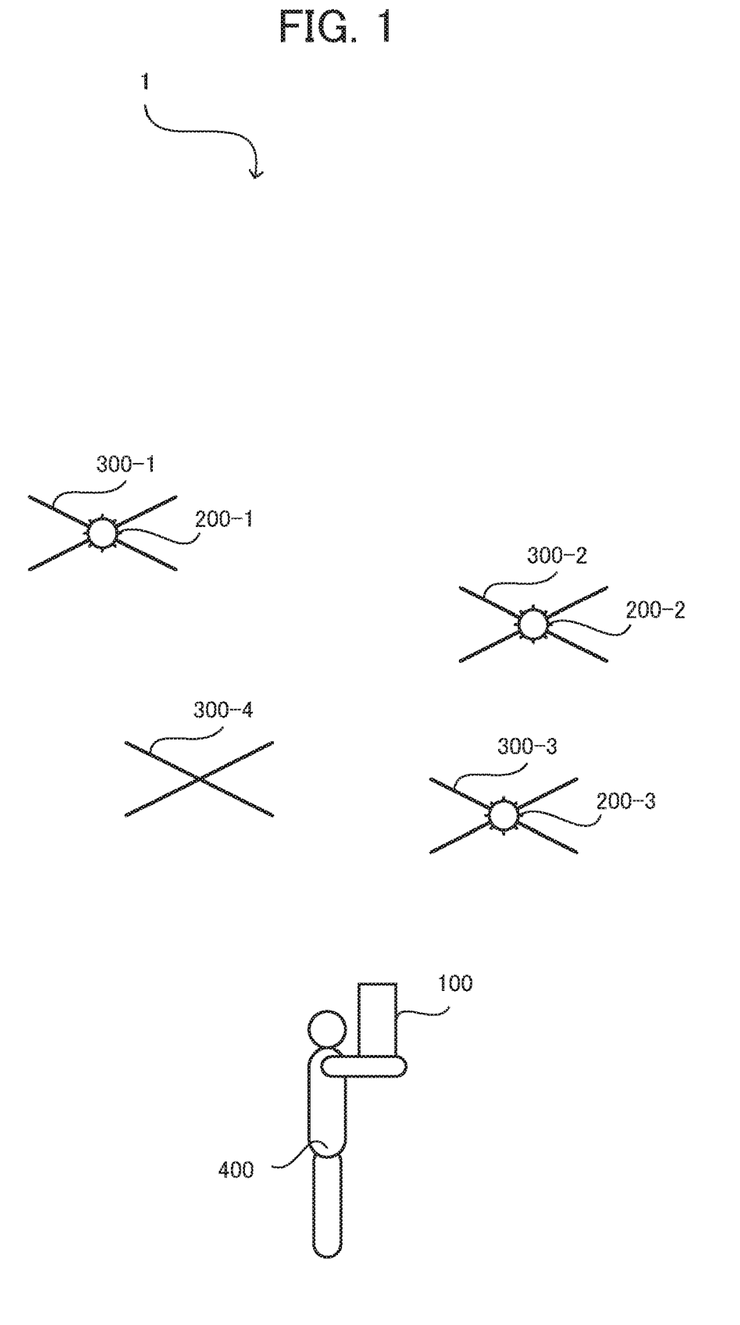
FIG. 1 is a drawing illustrating an example arrangement of a portable terminal and markers constituting an optical communication system according to an embodiment of the present disclosure.

FIG. 1 is a drawing illustrating the configuration of an optical communication system. As illustrated in FIG. 1, an optical communication system 1 comprises a portable terminal 100 serving as a notification device and markers 200-1, 200-2, and 200-3. The markers 200-1, 200-2, and 200-3 are collectively called "the markers 200" as appropriate. The optical communication system 1 in this embodiment can determine whether flying objects 300-1, 300-2, 300-3, and 300-4 serving as mobile bodies are appropriate flying objects performing optical communication, by using optical communication between the markers 200 and the portable terminal 100. The flying objects 300-1, 300-2, 300-3, and 300-4 are collectively called "the flying objects 300" as appropriate.

The portable terminal 100 is a portable terminal such as a tablet-type personal computer, a cellphone, a smartphone, and a note-type personal computer. The portable terminal 100 is carried by a user 400.

The marker 200-1 is attached to the flying object 300-1. The marker 200-1 emits light changing in luminance and/or hue with time in a signal format predetermined in the optical communication system 1 and presenting predetermined information. The marker 200-2 is attached to the flying object 300-2. The marker 200-2 emits light changing in luminance and/or hue with time in a signal format not predetermined in the optical communication system 1. The marker 200-3 is attached to the flying object 300-3. The marker 200-3 emits light changing in luminance and/or hue with time in a signal format predetermined in the optical communication system 1 but emits light presenting information other than the predetermined information which is presented by the light emitted by the marker-200-1. Moreover, the flying object 300-4 has no marker 200 attached.

In this embodiment, the marker 200-1 emitting light changing in luminance and/or hue with time in a signal format predetermined in the optical communication system 1 and emitting light presenting predetermined information is an appropriate (or authorized) marker performing optical communication with the portable terminal 100. The flying object 300-1 having the marker 200-1 attached is an appropriate flying object. On the other hand, the marker 200-2 emitting light changing in luminance and/or hue with time in a signal format not predetermined in the optical communication system 1 is an inappropriate (or non-authorized) marker not performing optical communication with the portable terminal 100 and the flying object 300-2 having the marker 200-2 attached is an inappropriate flying object. Moreover, the marker 200-3 emitting light changing in luminance and/or hue with time in a signal format predetermined in the optical communication system 1 but emitting light presenting information other than the predetermined information is an inappropriate (or non-authorized) marker not performing optical communication with the portable terminal 100 and the flying object 300-3 having the marker 200-3 attached is an inappropriate flying object. Moreover, the flying object 300-4 having no marker 200 attached is an inappropriate marker not performing optical communication.

Figure 2:
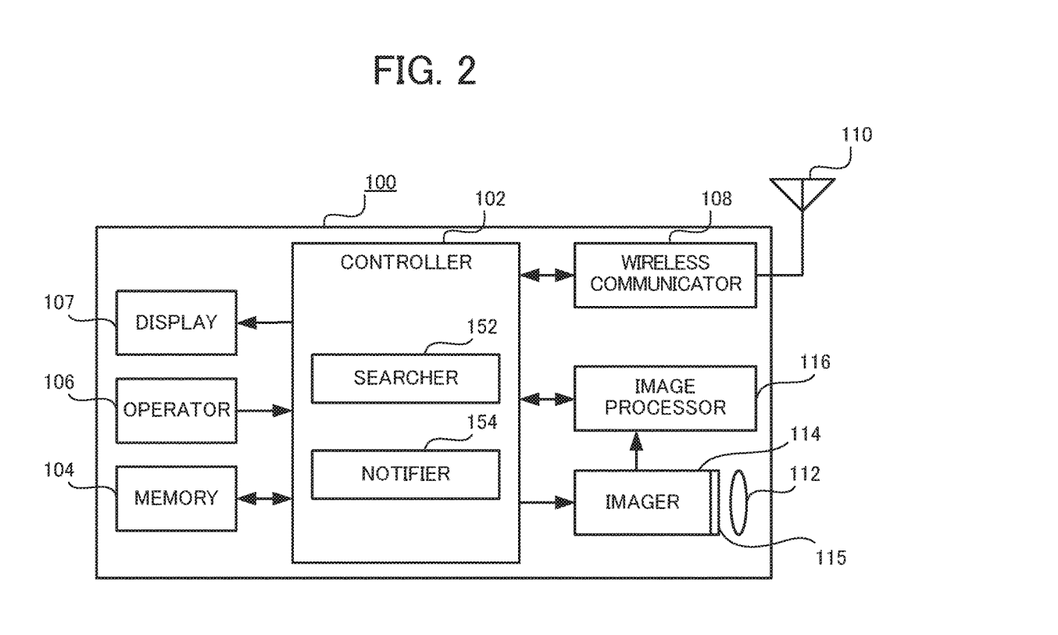
FIG. 2 is a drawing illustrating an example of a portable terminal according to an embodiment.

The portable terminal 100 captures images of a region where the flying objects 300-1 to 300-4 are present through operation of the user 400 and receives light emitted by the markers 200-1, 200-2, and 200-3. FIG. 2 is a drawing illustrating the configuration of the portable terminal 100. The portable terminal 100 illustrated in FIG. 2 includes a controller 102, a memory 104, an operator 106, a display 107, a wireless communicator 108, an antenna 110, a lens 112, an imager 114, and an image processor 116. Here, the imager 114 and the image processor 116 are considered an acquirer.

The controller 102 comprises, for example, a central processing unit (CPU). The memory 104 comprises, for example, a random access memory (RAM) and/or a read only memory (ROM). The memory 104 stores various kinds of information used for controls and the like in the portable terminal 100. The controller 102 executes software procedures according to programs stored in the memory 104 (for example, a program for realizing the operation of the portable terminal 100 illustrated in FIG. 4) so as to realize the functions of a searcher 152 and a notifier 154.

The searcher 152 detects a region (a color change region) in which the brightness and/or hue changes within image frames supplied from the image processor 116. The notifier 154 determines whether the brightness and/or hue change with time in the detected color change region matches one of search rules (reference patterns) for each of multiple signal formats predetermined in the optical communication system 1.

Figure 3:
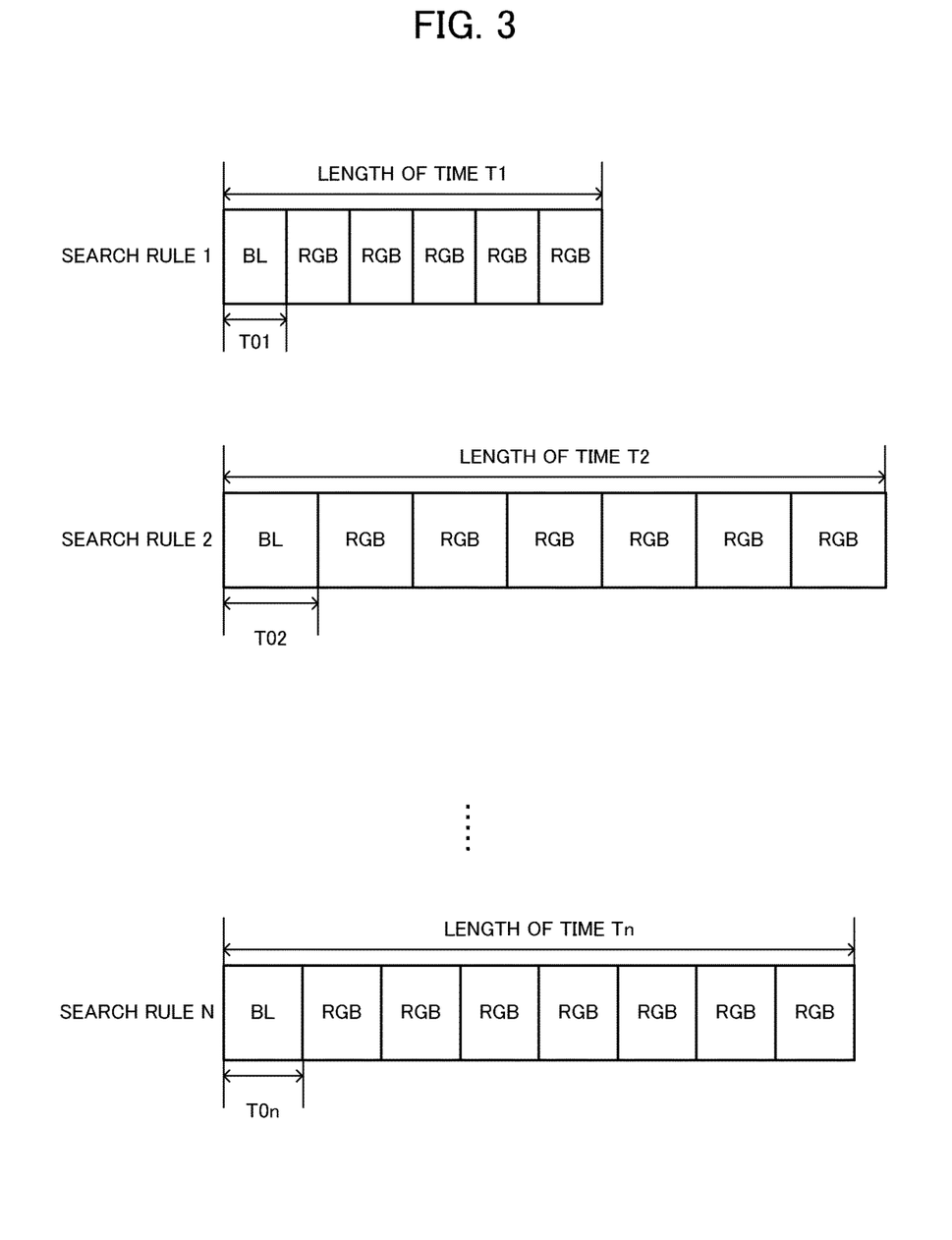
FIG. 3 is a chart illustrating an example of search rules according to an embodiment.

FIG. 3 is a chart illustrating an example of search rules. FIG. 3 shows n different search rules (search patterns), a search rule 1 to a search rule n, which define signal formats of the light signal, i.e. the brightness and/or hue change with time. The search rule 1 comprises six light emission periods in a length of time T1; a single light emission period has a length of time T01. The six light emission periods comprise a non-emission period (BL) corresponding to a header and five emission periods in each of which any of red (R) light, green (G) light, and blue (B) light are emitted. The search rule 2 comprises seven light emission periods in a length of time T2; a single light emission period has a length of time T02. The seven light emission periods comprise a non-emission period (BL) corresponding to a header and six emission periods in each of which any of red (R) light, green (G) light, and blue (B) light are emitted. The search rule n comprises n eight light emission periods in a length of time Tn; a single light emission period has a length of time T0n. The eight light emission period comprise a non-emission period (BL) corresponding to a header and seven emission periods each of which any of red (R) light, green (G) light, and blue (B) light are emitted. Predetermined information corresponding to each of the search rules is pre-stored in the memory 104. In other words, predetermined information is assigned to each of the search rules, or the signal formats. Here, in this embodiment, the imaging cycle, in other words, frame cycle of the imager 114 within the portable terminal 100 is shorter than the shortest one of the light emission periods T01 to T0n of the search rules 1 to n.

When the brightness and/or hue change with time in the detected color change region matches at least one of search rules, the notifier 154 attempts to reproduce information presented by brightness and/or hue change with time by decoding the change using a decoding process corresponding to the matched search rule. When the brightness and/or hue change with time in the color change region matches one of search rules and the reproduced information matches the predetermined information pre-stored in the memory 104 and corresponding to the matched search rule, the notifier 154 provides a notice that the marker 200 corresponding to the color change region is an appropriate marker and the flying object 300 having the marker 200 attached is an appropriate flying object and also provides a notice that the other flying objects 300 are inappropriate flying objects. Detailed operations of the searcher 152 and the notifier 154 will be described below.

Returning to FIG. 2 again, the explanation is made. The operator 106 comprises a numerical keypad, function keys, and the like, and serves as an interface used for entering user operation contents. The display 107 comprises, for example, a liquid crystal display (LCD), a plasma display panel (PDP), an electroluminance (EL) display, or the like. The display 107 displays images according to image signals output from the controller 102.

The wireless communicator 108 is configured by using, for example, a radio frequency (RF) circuit, a baseband (BB) circuit, or the like. The wireless communicator 108 transmits and receives radio signals via the antenna 110. Moreover, the wireless communicator 108 encodes and modulates transmission signals and demodulates and decodes reception signals.

The lens 112 comprises a zoom lens and the like. The lens 112 is moved by zooming operation from the operator 106 and focusing control by the controller 102. As the lens 112 moves, the imaging field angle and the optical image while the imager 114 captures images are controlled.

The imager 114 comprises multiple light receiving elements regularly arranged in a two-dimensional array on a light receiving surface 115. The light receiving elements are, for example, charge coupled devices (CCD), complementary metal oxide semiconductors (CMOS), or the like. The imager 114 captures an optical image (receives light) entered through the lens 112 in a predetermined range of imaging field angle based on control signals from the controller 102 and converts the image signals within the imaging field angle to digital data to generate a frame. Moreover, the imager 114 captures images and generates frames successively with time and outputs successive frames to the image processor 116.

The image processor 116 adjusts the frames (digital data) output from the imager 114 in image quality and image size for displaying the frames on the display 107 as a though-the-lens image based on control signals from the controller 102 and outputs the frames to the controller 102. Moreover, the image processor 116 has the function of encoding and filing an optical image within the imaging field angle of the imager 114 at the time of a recording order or in a display range displayed on the display 107 into, for example, a compression coding format such as the joint photographic experts group (JPEG) when control signals based on a recording order operation from the operator 106 are entered.

Figure 4:
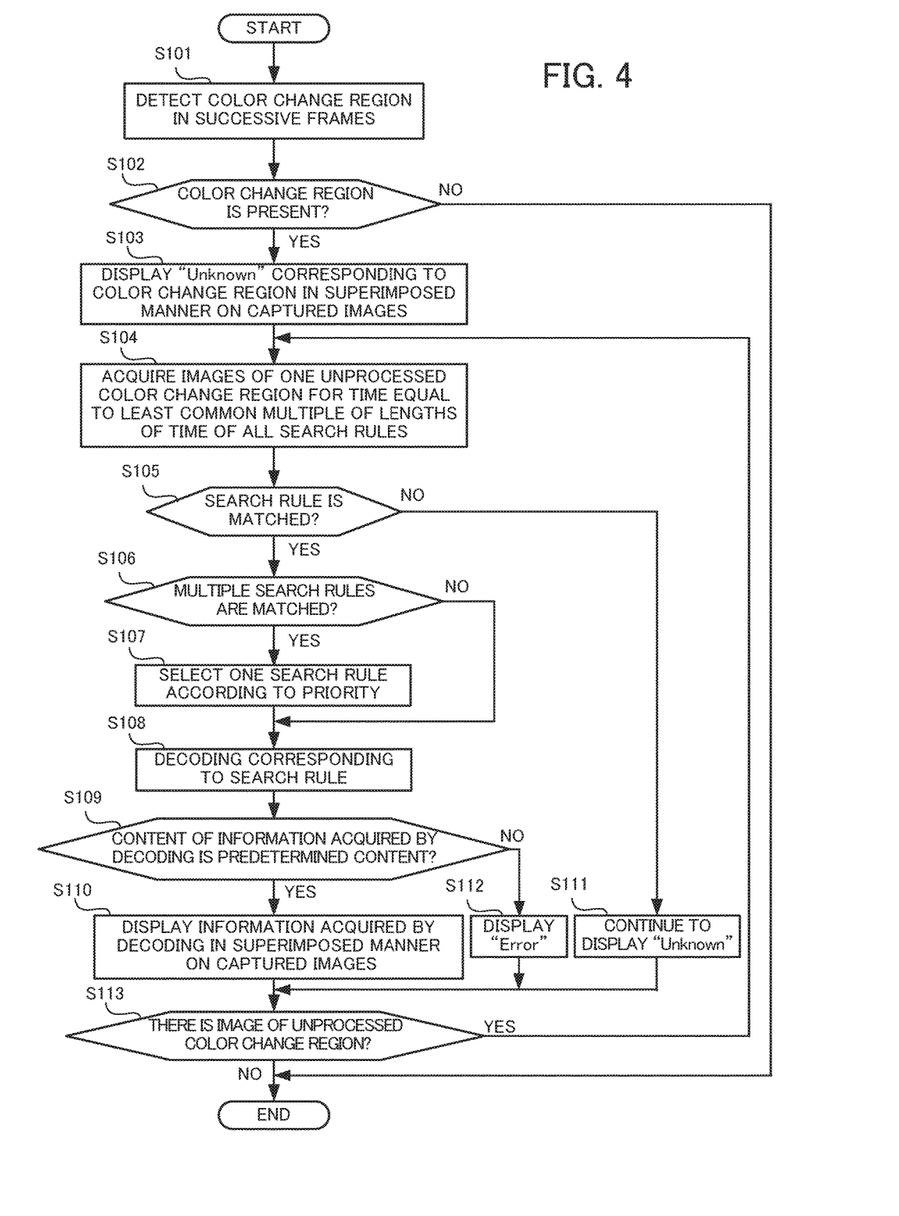
FIG. 4 is a flowchart illustrating an example of an operation of a portable terminal according to an embodiment.

Operation of the portable terminal 100 will be described next. FIG. 4 is a flowchart illustrating an example of an operation of the portable terminal 100.

As described above, the marker 200-1 attached to the flying object 300-1 emits light changing in luminance and/or hue with time in a signal format predetermined in the optical communication system 1, in other words in a light emission mode corresponding to any of the search rules 1 to n. The marker 200-2 attached to the flying object 300-2 emits light changing in luminance and/or hue with time in a signal format not predetermined in the optical communication system 1, in other words in a light emission mode corresponding to none of the search rules 1 to n. The marker 200-3 attached to the flying object 300-3 emits light changing in luminance and/or hue with time in a signal format predetermined in the optical communication system 1, in other words in a light emission mode corresponding to any of the search rules 1 to n, but emits light presenting information other than the predetermined information. Therefore, the marker 200-3 cannot communicate with the portable terminal 100 through the optical communication. Moreover, the flying object 300-4 has no marker attached.

Setting the region in which the flying objects 300-1 to 300-4 are present as the imaging range, the imager 114 within the portable terminal 100 successively captures images and generates successive frames from the captured successive images, and outputs the successive frames to the image processor 116. The image processor 116 adjusts the frames output from the imager 114 in image quality and image size for displaying the frames on the display 107 as a through-the-lens image, and outputs the adjusted successive frames to the controller 102. The searcher 152 within the controller 102 detects a region (a color change region) of which the brightness and/or hue changes from the successive frames from the image processor 116 (Step S101).

Specifically, the searcher 152 judges the brightness and/or hue of pixels in the image data of the successive frames. Furthermore, the searcher 152 detects, as a color change region, a region of pixels of which the brightness is equal to or higher than a predetermined value and the hue sequentially changes to any of red (R), green (G), and blue (B). In this embodiment, the regions of images of the markers 200-1 to 200-3 within the frames are detected as color change regions. Here, if the position of a color change region changes in the successive frames, the searcher 152 can detect a color change region by following the changing position.

Then, the searcher 152 determines whether a color change region is detected in Step S101 (Step S102). If no color change region is detected (Step S102; NO), a series of operations ends.

On the other hand, if a color change region is detected (Step S102; YES), the notifier 154 controls the display 107 to display texts "Unknown" corresponding to the detected color change region, in a superimposed manner, so as to superimpose the texts on the captured through-lens-images (Step S103).

Specifically, the controller 102 controls display of the successive frames from the image processor 116 on the display 107 as a through-the-lens image. The notifier 154 recognizes the position (the coordinates) of the detected color change region within the frames. The notifier 154 controls a display position of "Unknown" at or near the recognized position of the color change region within the frames on the display 107.

Figure 5:
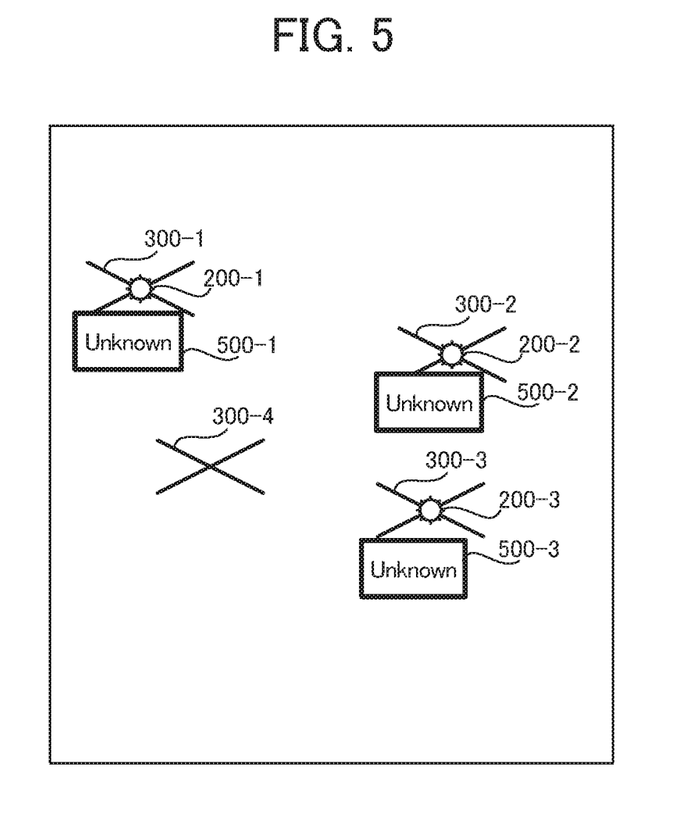
FIG. 5 is a drawing illustrating a first example of an image display according to an embodiment.

In this embodiment, as illustrated in FIG. 5, texts "Unknown" 500-1 is displayed near the color change region that is the region of an image of the marker 200-1, texts "Unknown" 500-2 is displayed near the color change region that is an image of the region of the marker 200-2, and texts "Unknown" 500-3 is displayed near the color change region that is the region of an image of the marker 200-3 within the frames on the display 107.

Returning to FIG. 4 again, the explanation is made. Then, the notifier 154 selects one color change region that has not been processed in the procedure described below. Furthermore, the notifier 154 acquires images of the selected color change region for a time equal to the least common multiple of the lengths of time corresponding to all search rules (Step S104).

Specifically, when there are the search rules 1, 2, . . . and n as illustrated in FIG. 3, the notifier 154 calculates the least common multiple of the length of time T1 of the search rule 1, the length of time T2 of the search rule 2, . . . and the length of time Tn of the search rule n, and acquires the images of the selected color change region for a time equal to the least common multiple.

Then, the notifier 154 determines whether the brightness and/or hue change with time in the acquired images of the color change region for a time equal to the least common multiple matches any of the search rules 1 to n (Step S105). For example, the notifier 154 determines that the brightness and/or hue change in the images of the color change region matches the search rule 1 in FIG. 3 when the non-emission period (BL) and the emission period of any of red (R), green (G), and blue (B) are the length of time T01 and the non-emission period (BL) appears in every length of time T1. Moreover, the notifier 154 determines that the brightness and/or hue change in the images of the color change region matches the search rule 2 in FIG. 3 when the non-emission period (BL) and the emission period of any of red (R), green (G), and blue (B) are the length of time T02 and the non-emission period (BL) appears in every length of time T2. The component that performs this determination may be a determiner.

If any search rule is matched (Step S105; YES), then, the notifier 154 determines whether the brightness and/or hue change with time in the images of the color change region matches multiple search rules (Step S106). If multiple search rules are matched (Step S106; YES), the notifier 154 selects one search rule among the multiple search rules matched according to predetermined priority (Step S107). For example, priority levels are set for the search rules 1 to n in FIG. 3 according to the importance of information acquired by the decoding described below. Information of the priority is stored in the memory 104 in association with information of the search rules.

After one search rule is selected in Step S107 or if determined not to match multiple search rules in Step S106 (Step S106; NO), the notifier 154 decodes the brightness and/or hue change with time using the decoding process corresponding to the matched search rule to reproduce information (Step S108). Specifically, the red (R), green (G), and blue (B) emission periods in a search rule serves as three different symbols and a combination of red (R), green (G), or blue (B) emission periods in a search rule, namely a combination of three symbols, presents information.

Then, the notifier 154 determines whether the content of information acquired by the decoding is the content of predetermined information corresponding to the search rule determined to match (Step S109). Specifically, the contents of predetermined information corresponding to the search rules are stored in the memory 104 in association with the search rules. The notifier 154 reads from the memory 104 the content of predetermined information associated with one search rule determined to match in Step S105 or one search rule selected in Step S107. Furthermore, the notifier 154 determines whether the content of information acquired by the decoding in Step S108 is equal to the content of predetermined information read from the memory 104.

If the content of information acquired by the decoding matches the content of predetermined information corresponding to the search rule determined to match (Step S109; YES), the notifier 154 controls the display 107 to superimpose the information acquired by the decoding on the images of the frames (Step S110).

Specifically, the controller 102 controls the display 107 to display the successive frames from the image processor 116 as a through-the-lens image. The notifier 154 recognizes the position (the coordinates) of the detected color change region within the frames. Furthermore, the notifier 154 controls to superimpose the information, acquired by the decoding, on the live view images at or near the recognized position of the color change region within the frames displayed on the display 107.

On the other hand, in Step S105, if determined to match no search rule (Step S105; NO), the notifier 154 controls the display 107 to continue to superimpose "Unknown" in association with the color change region on the captured live view images (Step S111). Furthermore, in Step S109, if the content of information acquired by the decoding is not the content of predetermined information corresponding to the search rule determined to match (Step S109; NO), the notifier 154 superimposes texts "Error" in association with the color change region on the captured images (Step S112).

Figure 6:
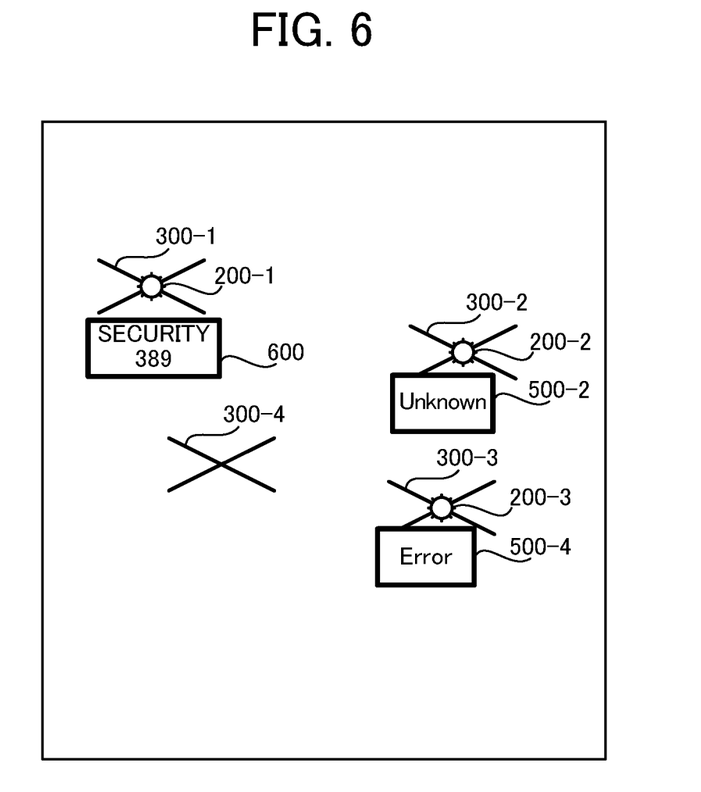
FIG. 6 is a drawing illustrating a second example of an image display according to an embodiment.

For example, a case is discussed in which i) the brightness and/or hue change with time in the images of a color change region corresponding to the marker 200-1 matches a search rule and information acquired by the decoding matches the content of predetermined information corresponding to the search rule determined to match, ii) the brightness and/or hue change with time in the images of a color change region corresponding to the marker 200-2 matches no search rule, and iii) the brightness and/or hue change with time in the images of a color change region corresponding to the marker 200-3 matches a search rule but information acquired by the decoding does not match the content of predetermined information corresponding to the search rule determined to match. In this case, as illustrated in FIG. 6, texts "SECURITY 389" 600 that is information acquired by the decoding is superimposed on the captured live view image near the color change region that is the region of an image of the marker 200-1, the texts "Unknown" 500-2 is continued to be displayed near the color change region that is the region of the marker 200-2, and texts "Error" (undisplayable) 500-4 is superimposed on the captured live view image near the color change region that is the region of the marker 200-3 within the frames on the display 107.

Returning to FIG. 4 again, the explanation is made. After information acquired by the decoding is superimposed on the captured images in Step S110 or after the display "Unknown" is continued in Step S111 or after texts "Error" is displayed on the frames that are the captured images in Step S112, the notifier 154 determines whether there is a color change region that has not processed in the processing of Steps S104 to S112 (Step S113). If there is an unprocessed color change region (Step S113; YES), the processing of Step S104 and subsequent steps is repeated. On the other hand, if there is no unprocessed color change region (Step S113; NO), a series of operations ends.

As described above, in this embodiment, the portable terminal 100 detects a color change region corresponding to a marker 200 in successive frames and determines whether the brightness and/or hue change with time in the color change region matches a search rule. Subsequently, when the brightness and/or hue change with time in the color change region matches a search rule, the portable terminal 100 reproduces information by decoding the change with time and determines whether the information is the content of predetermined information corresponding to the search rule determined to match.

Furthermore, when the reproduced information is the content of predetermined information corresponding to the search rule determined to match, the portable terminal 100 displays the information in association with the color change region to provide a notice that the corresponding flying object 300 is an appropriate flying object performing optical communication. On the other hand, when the brightness and/or hue change with time in the color change region does not match any search rule, the portable terminal 100 displays "Unknown" in association with the color change region to provide a notice that the corresponding flying object 300 is an inappropriate flying object not performing optical communication. Moreover, when the reproduced information is not the content of predetermined information corresponding to the search rule determined to match, the portable terminal 100 displays "Error" in association with the color change region to provide a notice that the information transmitted by the corresponding flying object 300 is not decodable and if decoded, the information is insignificant or something other than pre-provided service.

As a result, the user 400 of the portable terminal 100 can recognize i) a flying object 300 to which a marker 200 corresponding to a color change region (for example, the flying object 300-1) as an appropriate flying object performing optical communicating if the reproduced information is displayed in association with the color change region, and ii) recognize a flying object 300 to which a marker 200 corresponding to a color change region (for example, the flying object 300-2 in FIG. 6) as an inappropriate flying object not performing optical communicating if "Unknown" is displayed in association with the color change region. Furthermore, if "Error" is displayed in association with a color change region, the user 400 can recognize a flying object 300 to which a marker 200 corresponding to the color change region (for example, the flying object 300-3 in FIG. 6) as a flying object performing optical communication but of which the information is displayable. Moreover, if neither the reproduced information nor "Unknown" is displayed, in other words when a flying object 300 has no marker 200 attached (for example, the flying object 300-4 in FIG. 6), the user 400 of the portable terminal 100 can recognize the flying object as an inappropriate flying object not performing optical communication.

Moreover, the portable terminal 100 acquires images of color change region for a time equal to the least common multiple of the lengths of time corresponding to the search rules based on the search rules for each of multiple kinds of signal formats. Therefore, the portable terminal 100 can acquire images of color change region for a time necessary for determining whether the brightness and/or hue change with time in the color change region matches multiple search rules and furthermore, can precisely determine whether a flying object 300 is appropriate.

Moreover, the portable terminal 100 determines whether the reproduced information is the content of predetermined information corresponding to a search rule determined to match and thus, can precisely determine whether a flying object 300 is appropriate based on the reproduced information.

Moreover, when multiple color change regions are acquired, the portable terminal 100 determines, on each color change region, whether the brightness and/or hue change with time in the color change region matches multiple search rules. As a result, the portable terminal 100 can provide a notice, on each of the multiple color change regions, as to whether the information from the corresponding flying object 300 can be displayed.

The present disclosure is not confined to the description of the above embodiment and the drawings and is applicable, for example, to a case in which a status lamp provided to a control target device in an automated factory (factory automatization) system is the information source. In such a case, the above embodiment and the drawings can be changed as appropriate.

For example, in the above embodiment, the search rules have different lengths of time as illustrated in FIG. 3. However, for example, it may be possible that the search rules have the same length of time and the numbers of light emission patterns and/or the lengths of time of light emission patterns included in the search rules are different. Moreover, it may also be possible that the search rules comprise the same number of light emission patterns and the lengths of time of light mission patterns are different. Moreover, for example, it may also be possible that the search rules comprise light emission patterns of the same length of time and the numbers of light emission patterns and/or the lengths of time of the search rules are different.

Moreover, in the above embodiment, when the brightness and/or hue change with time in images of a color change region matches multiple search rules, the portable terminal 100 selects one search rule according to priority and performs the decoding corresponding to the selected search rule. However, the portable terminal 100 may perform the decoding corresponding to all search rules when multiple search rules are matched.

Moreover, in the above embodiment, the portable terminal 100 determines whether the brightness and/or hue change with time in a color change region matches a search rule and then determines whether the reproduced information is the content of predetermined information corresponding to the search rule determined to match. However, the portable terminal 100 may determine only whether the brightness and/or hue change with time in a color change region matches a search rule, and if matches, provide a notice that the corresponding flying object 300 is appropriate.

Moreover, in the above embodiment, the portable terminal 100 provides a notice as to whether the flying object 300 is appropriate based on the color change region. This is not restrictive and the present disclosure is applicable as long as notice of a color change region being a predetermined region is predetermined. Furthermore, only "Unknown" (not communicating) and "Error" (no information) are described as display contents. However, the portable terminal 100 may display "Secret" (confidential), "Private" (individually-owned), or "Public" (public service) if the affiliation of the flying object 300 is known from part of the reproduced information.

Moreover, in the above embodiment, the portable terminal 100 comprises the wireless communicator 108 and the antenna 110. However, the portable terminal 100 may not comprise the wireless communicator 108 and the antenna 110.

The function of the portable terminal 100 may be realized by, for example, a computer executing programs. Moreover, the programs for realizing the function of the portable terminal 100 may be stored on a non-transitory computer-readable recording medium such as a compact disc read only memory (CD-ROM) or downloaded on a computer via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A notification device, comprising:
  a controller which comprises a processor and is configured to perform operations including:
  acquiring images successively;
  acquiring a predetermined image region corresponding to a detection target from the images successively acquired;
  providing a notice, when the predetermined image region is acquired, as to whether the predetermined image region is a region of information transmitted by a transmission device of a visible light communication system by means of light emission, the notice being determined based on a comparison of optical change in brightness and/or hue in the predetermined image region with search rules for each of multiple kinds of signal formats, each of the search rules defining a signal format of the information transmitted by the transmission device, the search rules having various time periods, each of the search rules having a non-emission period and a number of emission periods within the time period thereof; and
  determining whether the predetermined image region is a region of information transmitted by the transmission device of the visible light communication system by means of light emission from images corresponding to a time equal to or longer than a least common multiple of the time periods of the search rules,
  wherein the controller provides a notice of a determination result.

2. The notification device according to claim 1, wherein the controller determines whether the predetermined image region is a region of information transmitted by the transmission device based on a comparison of contents of information transmitted by the transmission device with the contents of information previously assigned to each of the search rules.

3. The notification device according to claim 1, wherein when a plurality of the predetermined image regions is acquired as a result of acquisition of the predetermined image region, the controller provides a notice, on each of the predetermined image regions, as to whether each of the predetermined image regions is a region of information transmitted by the transmission device of the visible light communication system by means of light emission.

4. The notification device according to claim 1, wherein the controller displays the notice in a display.

5. The notification device according to claim 4, wherein the display provides the notice as to whether the predetermined image region is a region of information transmitted by the transmission device of the visible light communication system by means of light emission in a superimposed manner of displaying texts on the acquired images.

6. The notification device according to claim 1, wherein the detection target is a mobile body.

7. A notification method, comprising:
an acquisition step of successively acquiring images;
a search step of acquiring a predetermined image region corresponding to a detection target from the successively acquired images;
a notification step of providing a notice, when the predetermined image region is acquired in the search step, as to whether the predetermined image region is a region of a light signal emitted by a transmission device based on comparing optical change in brightness and/or hue in the predetermined image region and with search rules defining signal formats of the light signal, the signal formats having predetermined time periods, each of the signal formats including a light-non-emission period and light-emission periods in every predetermined time period; and
a determination step of determining whether the predetermined image region is a region of the light signal emitted by the transmission device, based on the images corresponding to a time period equal to or longer than a least common multiple of the predetermined time periods of the signal formats,
wherein in the notification step, a determination result in the determination step is notified.

8. The notification method according to claim 7, wherein in the notification step, a notice is provided as to whether the predetermined image region is a region of the light signal emitted by the transmission device by comparing contents reproduced from the optical change in brightness and/or hue in the predetermined image region with contents of information previously assigned to each of the search rules.

9. The notification method according to claim 7, wherein in the notification step, when a plurality of the predetermined image regions is acquired as a result of acquisition of the predetermined image region in the search step, notice is provided, on each of the predetermined image regions, as to whether each of the predetermined image regions is a region of the light signal emitted by the transmission device.

10. A non-transitory computer-readable recording medium storing a program for causing a computer to perform:
acquiring images successively;
acquiring a predetermined image region corresponding to a detection target from the images successively acquired;
providing a notice, when the predetermined image region is acquired, as to whether the predetermined image region is a region of a light signal emitted from a transmission device based on comparing optical change in brightness and/or hue in the predetermined image region with search rules defining signal formats of the light signal, the signal formats having a predetermined time period, each of the signal formats including a non-emission period and light-emission periods in every predetermined time period; and
determining whether the predetermined image region is a region of the light signal emitted from the transmission device, based on the acquired images corresponding to a time period equal to or longer than a least common multiple of the predetermined time periods of the signal formats.

11. The non-transitory computer-readable recording medium according to claim 10, wherein
the program causes the computer to provide a notice as to whether the predetermined image region is a region of the light signal emitted from the transmission device by comparing contents reproduced from the optical change in brightness and/or hue in the predetermined image region with contents of information previously assigned to each of the search rules.

12. The non-transitory computer-readable recording medium according to claim 10, wherein the program causes the computer to, when a plurality of the predetermined image regions are acquired provide a notice, on each of the predetermined image regions, as to whether each of the predetermined image regions region is a region of the light signal emitted from information transmitted by the transmission device.

13. A notification device, comprising:
a controller which comprises a processor and is configured to perform operations including:
acquiring images successively;
acquiring a predetermined image region corresponding to a detection target from the images successively acquired;
providing a notice, when the predetermined image region is acquired, as to whether the predetermined image region is a region of information transmitted by a transmission device of a visible light communication system by means of light emission, the notice being determined based on a comparison of optical change in brightness and/or hue in the predetermined image region with search rules for each of multiple kinds of signal formats, each of search rules defining a signal format of the information transmitted by the transmission device, the search rules having various time periods, each of the search rules having a non-emission period and a number of emission periods within the time period thereof;
wherein the controller displays the notice in a display, and
wherein the display provides the notice as to whether the predetermined image region is a region of information transmitted by the transmission device of the visible light communication system by means of light emission in a superimposed manner of displaying texts on the acquired images.

14. A notification method, comprising:
an acquisition step of successively acquiring images;
a search step of acquiring a predetermined image region corresponding to a detection target from the successively acquired images;
a notification step of providing a notice, when the predetermined image region is acquired in the search step, as to whether the predetermined image region is a region of a light signal emitted by a transmission device based on comparing optical change in brightness and/or hue in the predetermined image region with search rules defining signal formats of the light signal, the signal formats having predetermined time periods, each of the signal formats including a light-non-emission period and light-emission periods in every predetermined time period;

wherein in the notification step, a determination result in the determination step is notified, wherein in the notification step, the controller displays the notice in a display, and wherein in the notification step, the display provides the notice as to whether the predetermined image region is a region of information transmitted by the transmission device of the visible light communication system by means of light emission in a superimposed manner of displaying texts on the acquired images.

15. A non-transitory computer-readable recording medium storing a program for causing a computer to perform:

acquiring images successively;

acquiring a predetermined image region corresponding to a detection target from the images successively acquired;

providing a notice, when the predetermined image region is acquired, as to whether the predetermined image region is a region of a light signal emitted from a transmission device based on comparing optical change in brightness and/or hue in the predetermined image region with search rules defining signal formats of the light signal, the signal formats having a predetermined time period, each of the signal formats including a non-emission period and light-emission periods in every predetermined time period;

wherein the controller displays the notice in a display; and wherein the display provides the notice as to whether the predetermined image region is a region of information transmitted by the transmission device of the visible light communication system by means of light emission in a superimposed manner of displaying texts on the acquired images.

* * * * *

UNITED STATES PATENT AND TRADEMARK OFFICE
CERTIFICATE OF CORRECTION

PATENT NO. : 10,367,581 B2
APPLICATION NO. : 15/693969
DATED : July 30, 2019
INVENTOR(S) : Nobuo Iizuka et al.

It is certified that error appears in the above-identified patent and that said Letters Patent is hereby corrected as shown below:

In the Claims
Claim 7, Column 11, Line 26, after "region" delete "and".
Claim 12, Column 12, Line 25, after "regions" delete "region".
Claim 12, Column 12, Line 26, after "from" delete "information transmitted by".

Signed and Sealed this
Twenty-fifth Day of February, 2020

Andrei Iancu
*Director of the United States Patent and Trademark Office*